United States Patent
Kudo et al.

[11] 3,861,961
[45] Jan. 21, 1975

[54] GAS ELECTRODE

[75] Inventors: Tetsuichi Kudo; Motoko Yoshida; Hidehito Obayashi; Tetsuo Gejyo, all of Tokyo, Japan

[73] Assignee: Hitachi, Ltd., Tokyo, Japan

[22] Filed: Feb. 23, 1973

[21] Appl. No.: 335,336

[30] Foreign Application Priority Data
Feb. 25, 1972   Japan .............................. 47-18944

[52] U.S. Cl. ....................... 136/120 FC, 136/86 D
[51] Int. Cl. ........................................... H01m 13/00
[58] Field of Search ........ 136/120 FC, 86 D, 120 R, 136/86 F; 252/462, 521, 62.3 R

[56] References Cited
UNITED STATES PATENTS

| | | | |
|---|---|---|---|
| 3,400,054 | 9/1968 | Ruka et al. ........................ | 136/86 F |
| 3,404,040 | 10/1968 | Mitoff et al. ...................... | 136/86 F |
| 3,644,147 | 2/1972 | Young .............................. | 136/86 D |

FOREIGN PATENTS OR APPLICATIONS

| | | | |
|---|---|---|---|
| 636,309 | 2/1962 | Canada ............................ | 136/86 D |
| 789,089 | 7/1968 | Canada ............................ | 136/86 F |

OTHER PUBLICATIONS
Nature, Vol. 226, May 30, 1970, pages 847–848, "Low-Cost Oxygen Electrode Material."

Primary Examiner—Anthony Skapars
Attorney, Agent, or Firm—Stewart and Kolasch, Ltd.

[57] ABSTRACT

An oxide having the perovskite type crystal structure and represented by the general formula of $Ln_{1-x}A_x$-$Co_{1-y}Ni_yO_{3-\delta}$, (where $0 \leq x \leq 0.6$, $0.01 \leq y \leq 1.0$ and $0 \leq \delta \leq (x/2)$, and Ln denotes at least one element selected from the group consisting of La, Pr, Nd, Sm, Gd and Y, while A indicates at least one element selected from the group consisting of Ca, Ba, and Sr) is sintered into a porous sintered body. The porous sintered body is subjected to a water repellency treatment, to form a gas electrode.

The gas electrode thus formed possesses far more excellent characteristics as compared with a prior-art gas electrode of the carbon series, of the nickel series, or formed by kneading a perovskite type oxide.

7 Claims, 7 Drawing Figures

FIG. 1a
FIG. 1b
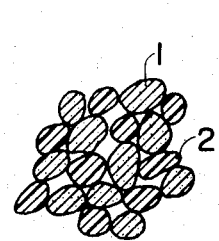
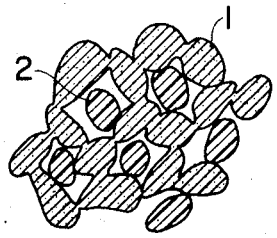
FIG. 2
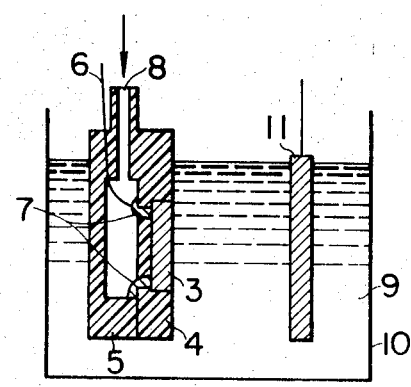

GAS ELECTRODE

BACKGROUND OF THE INVENTION

1. Field of the Invention

This invention relates to gas electrodes, and more particularly to a gas electrode which uses air or oxygen as a cathode active material in air-metal batteries as typified by an air-zinc battery or in a variety of fuel cells.

2. Description of the Prior Art

As typical air or oxygen electrodes, there have heretofore been mainly employed an electrode made of a carbonaceous material such as activated charcoal and graphite and an electrode principally containing such nickel as carbonyl nickel as its main constituent and electrolytic nickel.

Although the electrode made of the carbonaceous material is generally good in the current - voltage characteristic, it requires the addition of an expensive noble metal catalyzer such as platinum and palladium to said electrode. Moreover, in case of employing the electrode as the cathode of the air-zinc battery, it cannot be used for the opposing electrode at the anodic charging. Therefore, in the case where the air-zinc secondary battery is constructed using a carbonaceous electrode, it is required to separately provide a third electrode for charging. This leads to the disadvantages that the construction of the battery system becomes complicated and that the energy density of the battery lowered.

When employed in the air-metal secondary battery, the electrode containing nickel as its main constituent can be used as the opposite charging electrode for a short period of time, but it cannot be used for a long period of time. Its electrode is not good in the current - voltage characteristic. Besides, as in the case of the electrode of the carbonaceous material, the use of platinum or a similar noble metal is required as a catalyst, which increases the overall expense of the system.

On the other hand, the mixed oxide material having the perovskite type crystal structure, $Ln_{1-x}A_xCo_{1-y}Ni_yO_{3-\delta}$ (where $0 \leq x \leq 0.6$, $0.01 \leq y \leq 1.0$, $0 \leq \delta \leq (x/2)$, Ln denotes at least one element selected from the group consisting of La, Pr, Nd, Sm, Gd and Y, and A represents at least one element selected from the group consisting of Ca, Sr and Ba) is quite stable chemically, even in a strongly alkaline solution such as an aqueous solution of caustic potash, and still has a high oxidation resistance. Therefore, in the case where the composite oxide material is used for the air-metal secondary batteries represented by the air-zinc secondary battery, it is electrochemically stable to a cathodic current at the charging of the anode.

Furthermore, the electrode material has a high electronic conductivity and a high oxygen ion diffusibility. The electromotive reaction of an air electrode of the composite oxide exhibiting these properties is considered to be based on a peculiar mechanism which takes place through the diffusion of oxygen ions within the crystal of the composite oxide. It is considered that, in accordance with the electromotive reaction mechanism, the oxygen diffusibility and the electrode catalytic activity are in a proportional relationship with respect to each other. The inventors have previously proposed an air electrode which employs the perovskite type of oxides typified by $Nd_{0.8}Sr_{0.2}CoO_3$ of the same series as that of the electrode composition of the present invention. The material is also great in the diffusibility for oxygen ions within the crystal, has an extremely great air-electrode catalytic activity through the electromotive reaction based on the aforesaid mechanism, and manifests a good current - voltage characteristic.

However, when a cycle test for three hours for each of charging and discharging is conducted at a current density of 50 mA/cm² in an air-cadmium secondary battery with its cathode made of, for example, $Nd_{0.8}Sr_{0.2}CoO_3$, lowering in the potential of the air electrode at discharging begins to be noted roughly at the 200-th cycle, and thereafter, the air electrode is rapidly degraded. In the cycle test, the air electrode stated above was used as the opposing electrode at the charging of the cadmium electrode. The degradation is induced for the reason that, due to the charging and discharging cycles, the electrode gets wet with an aqueous alkaline solution and decreases in the effective electrode area, with the result that the current density at a part at which the electromotive reaction arises increases, making it impossible for the diffusion rate of oxygen ions within the crystal to follow the electrode reaction. It is accordingly considered that, if the oxygen ion diffusion coefficient within the oxide crystal constituting the electrode is large, the life of the electrode will become still longer, while the current - voltage characteristic will generally become good.

When the perovskite type of rare earch cobaltite $Ln_{1-y}A_xCoO_3$ typified by $Nd_{0.8}Sr_{0.2}CoO_3$ as lately suggested by the inventors has its positions B (namely, crystal lattice points occupied by Co) partially or wholly substituted by Ni, the perovskite type of composite oxide represented by $Ln_{1-x}A_xCo_{1-y}Ni_yO_3$ is obtained. The substitution product is 100 to 1,000 times greater in the oxygen ion diffusibility than the non-substitutive form. Even if the area of the so-called three-phase interface among oxygen, an electrolyte and an electrode material decreases, an air electrode employing the substitution product will not be largely degraded in the current density - voltage characteristic. It has an extraordinarily long life.

The electrode made of the composite oxide of this sort, however, has hitherto been the so-called Teflon coupling type of electrode which is formed by kneading the perovskite type composite oxide and polytetrafluoroethylene. Therefore, it has been impossible to make the best use of the excellent feature of the perovskite type composite oxide, and only extremely unsatisfactory characteristics have been attainable.

An example of the prior-art method of forming the electrode will be stated below.

1. 0.8 mol of neodymium acetate, 0.2 mol of strontium acetate, 0.9 mols of cobalt acetate and 0.1 mol of nickel acetate are dissolved in 5 lit. of ion-exchange water at 60°– 70°C.
2. After the solution is heated and solidified, the solid matter is baked at 900°C for 5 hours.
3. Powder of a composite oxide thus obtained is immersed in a cold acetic acid solution, to remove oxide particles not being under solid solution.
4. A procedure consisting of centrifugation and washing is repeated three times. Then, the powder is dried.
5. To 10 gr. of the powder of the perovskite type composite oxide as obtained in this way, 6.5 ml. of a watery dispersion containing 20 weight-% of polytetrafluoroethylene is added, and it is agitated well. Then, the oxide powder is condensed by polytetrafluoroethylene particles.

6. The condensed paste is applied on a nickel wire gauze at a surface density of 75 mg./cm$^2$. The applied paste is subjected to a pressure of 500 kg./cm$^2$, whereupon it is heat-treated in air at about 250°C. Thus, an electrode is obtained.

As apparent from the explanation of the example of the method of forming the electrode, in case of the electrode formed by the kneading or mixing process, the polytetrafluoroethylene particles lie between the respective oxide particles. Therefore there is only a slight amount of mutual contact between the oxide particles. For this reason, in spite of the fact that the electric conductivity of the oxide particle itself is very high, the electric conductivity of the electrode is low, and thus the voltage - current characteristic is inferior.

SUMMARY OF THE INVENTION

The present invention has been made in order to eliminate the disadvantages of the prior-art electrodes, and has as its object providing a gas electrode which has a small voltage rise relative to an increase in the current density, which has an excellent in the current - voltage characteristic and has a long life.

In order to accomplish the above-mentioned object, the present invention sinters at a high temperature an oxide of the perovskite type as indicated by a general formula of $Ln_{1-x}A_xCo_{1-y}Ni_yO_{3-\delta}$ (where $0 \leq x \leq 0.6$, $0.01 \leq y \leq 1.0$, $0 \leq \delta \leq (x/2)$, Ln denotes at least one element selected from the group consisting of La, Pr, Nd, Sm, Gd and Y, and A denotes at least one element selected from the group consisting of Ca, Ba and Sr), thereby forming a gas electrode having a porous sintered body which is high in its electric conductivity and which is long in its charging and discharging life.

BRIEF DESCRIPTION OF THE DRAWINGS

FIGS. 1a and 1b are diagrams showing the fine structures of a prior-art electrode and an electrode according to the present invention, respectively;

FIG. 2 is a model diagram of a battery constructed in order to measure the characteristics of gas electrodes.

DETAILED DESCRIPTION OF THE INVENTION

Figure 3:
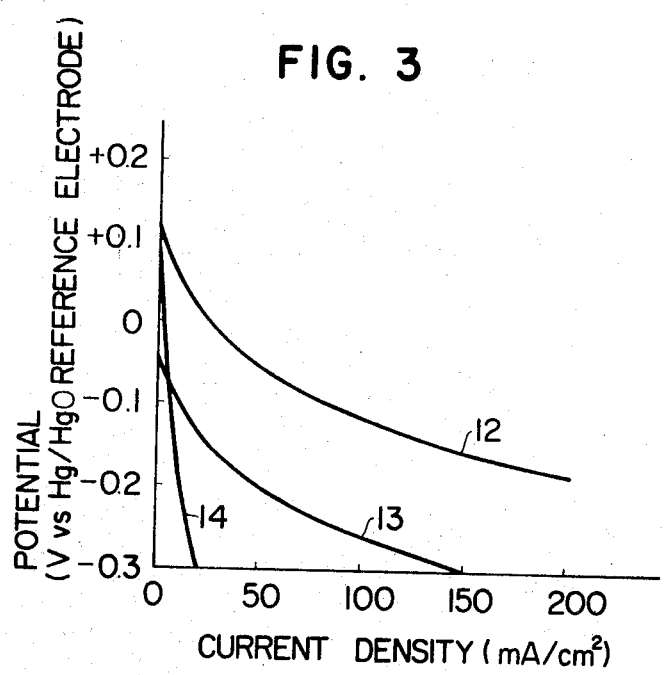
FIGS. 3, 4, 5 and 6 are graphs showing the characteristics of the gas electrodes according to the present invention.

A composite oxide for use in the present invention as indicated by a general formula of $Ln_{1-x}A_xCo_{1-y}Ni_yO_{3-\delta}$ (where $0 \leq x \leq 0.6$, $0.01 \leq y \leq 1.0$, $0 \leq \delta \leq (x/2)$, Ln denotes at least one element selected from the group consisting of La, Pr, Nd, Sm, Gd and Y, and A represents at least one element selected from the group consisting of Ca, Ba and Sr) has very excellent properties as a material for a gas electrode.

However, when an electrode is formed in accordance with the prior-art method in which the material is kneaded by the use of a polytetrafluoroethylene suspension, the characteristics of the electrode have not been satisfactory as stated previously.

FIG. 1a is a diagram which illustrates the fine structure of an electrode formed by the prior-art, kneading process. As apparent from the figure, the respective oxide particles 1 are coupled with polytetrafluoroethylene particles 2, and the oxide particles 1 are very rarely held in direct contact without the intervention of the particles 2. As a result, the electric resistance of the electrode naturally becomes extremely high.

In contrast, in a sintering type electrode formed according to the present invention, the oxide particles 1 are mutually coupled by sintering as shown in FIG. 1b.

More specifically, the sintering type electrode of the present invention undergoes the same steps of manufacture (1) - (4) at the formation of the kneading type electrode, up to the preparation of the powder of the composite oxide. In the present invention, however, the composite oxide powder obtained is molded under pressure, and is sintered at a high temperature of, for example, approximately 1,000°C so as to form a porous sintered body. When the sintering temperature in this case exceeds approximately 1,300°C, the perovskite type crystal structure is disintegrated. An excessively high temperature is therefore to be avoided. Usually, a good result is obtained at 850° - 1,100°C.

With various kinds of starting materials, the perovskite type oxide can be produced in a temperature range of from 600° to 1,000°C. At a temperature in the proximity of about 900°C. the most preferable result is obtained.

Thereafter, the sintered body is subjected to a water repellency treatment with a polytetrafluoroethylene suspension. Then, it is subjected to a heat treatment at 200° - 250°C. Finally, it is set in an air-electrode frame made of an acrylic resin. The electrode is thus completed.

With the sintering type electrode according to the present invention, accordingly, as shown in FIG. 1b, the oxide particles 1 are held in mutual contact. The tetrafluoroethylene particles 2 are merely present in the interstices of the sintered body, and do not act to intervene between the respectively adjacent oxide particles 1 to thereby isolate them.

The sintering type electrode of the present invention therefore exhibits an extraordinarily excellent characteristic of low electric resistance. In contradiction thereto, the kneading type electrode of the prior art has a very inferior characteristic, and can hardly be put into practical use.

The present invention will become more apparent from the following description of examples.

EXAMPLE 1

0.8 mol of neodymium acetate, 0.2 mol of strontium acetate, 0.9 mol of cobalt acetate and 0.1 mol of nickel acetate were dissolved in 5 lit. of ion-exchange water at 60° - 70°C. While being agitated, the mixed solution was dehydrated under a reduced pressure, to obtain a uniform powdery mixture of the acetates. After the powder was heated and decomposed, it was fired at 900°C for 5 hours. The powder obtained by the firing had methyl cellulose added thereto as a sizing agent, and was molded under a pressure of 100 kg./cm$^2$. The molded article was heated at 1,000°C for 1 hour, to sinter said article. Then, a porous sintered body having a porosity of 60% was obtained. As the sizing material in this case, there can be widely used alcohols such as polyvinyl alcohol and a variety of cellulose material such as methyl cellulose and carboxymethyl cellulose. The resultant electrode was impregnated with a watery dispersion solution of tetrafluoroethylene, and the suspending agent was heated and removed at 250°C. This procedure was carried out in order that the porous sintered body might have a water repelling action.

As shown in FIG. 2, the porous sintered body 3 was embedded in an air-electrode frame 5 made of an acrylic resin, and the space between it and an acrylic resin member 4 was sealed with epoxy series adhesives. A lead wire 6 is connected with a silver paste collector 7 which was formed at the peripheral part of the electrode by a thin application of the paste. In the figure, numeral 8 designates an air hole, 9 an electrolyte of 30% caustic potash, and 10 an electrolytic cell. Shown at 11 is a cadmium electrode. Thus, an air-cadmium battery was constructed.

The voltage - current density characteristic of the air electrode of the example is indicated at a curve 12 in FIG. 3. For the sake of comparisons, FIG. 3 shows at a curve 13 the characteristic of a prior-art sintered nickel air electrode, and at a curve 14 the characteristic of a kneading type electrode having the same composition as the electrode of the example. As apparent from FIG. 3, the current - voltage characteristic 12 of the sintering type air electrode having the composition with cobalt added, $Nd_{0.8}Sr_{0.2}Co_{0.9}Ni_{0.1}O_3$, is of course excellent as compared with the characteristic 13 of the prior-art sintered nickel electrode with a palladium catalyst added thereto. It exhibits a very large difference when compared with the characteristic 14 of the kneading type electrode employing the oxide material of the same composition as in the example. It is accordingly understood that the electrode of the example is far more excellent in the characteristic than the prior-art ones.

EXAMPLE 2

Figure 4:
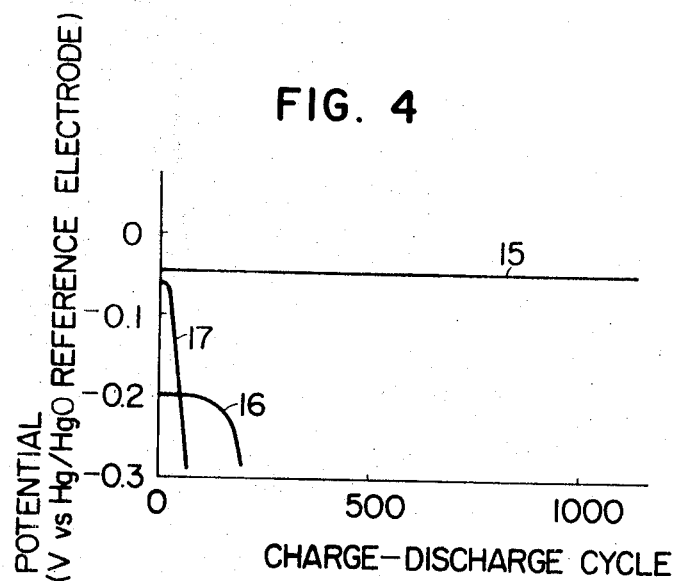

Description will now be made of the relationship between the potential and the number of charge-discharge cycles in the case where the air-cadmium battery shown in FIG. 2 was repeatedly subjected to charging and discharging at a current density of 50 mA/cm² for 4 hours for each of them. In this case, unlike that of the conventional air-cadmium battery, the opposing electrode at the charging of the cadmium electrode was the air electrode itself. FIG. 4 shows the potential variations of the air electrode of the present invention as dependent on the number of cycles, in comparison with those of the prior-art electrodes. Used as the electrolyte was 30% KOH, and the temperature of the battery was 25°C. Numeral 15 in FIG. 4 indicates the characteristic of the perovskite type oxide air electrode of the present invention employing the porous sintered body having the composition $Nd_{0.8}Sr_{0.2}Co_{0.9}Ni_{0.1}O_3$, numeral 16 that of the prior-art sintered nickel air electrode which was impregnated with palladium as the catalyst, and 17 that of the kneading type air electrode which employed the oxide of the same composition as in the example. It is apparent from FIG. 4 that the air electrode according to the present invention is far longer in life than the prior-art ones. Even with the same composition, the kneading type electrode is brought to the end of its life by only several tens of charge-discharge cycles, whereas the characteristic of the 1,100-th cycle does not differ from the original one in case of the sintered type. In this manner, the charge-discharge cycle life is made extremely long by the sintering treatment.

EXAMPLE 3

The perovskite type compound $Nd_{0.8}Sr_{0.2}Co_{1-z}Ni_zO_3$ can be synthesized by the conventional firing process referred to in the example 1, for $0 \leq z \leq 0.15$. However, when z is larger than 0.15, it cannot be produced by the conventional process. In order to obtain the compound of $z > 0.15$, the inventors adopted a method proposed by A. Wold, et al. ('Journal of the American Chemical Society,' Vol. 79, page 4911 (1957)).

More specifically, mixed oxide powder of a predetermined composition and sodium carbonate powder were mixed well at a weight ratio of 1:1 in an agate mortar. The resultant powdery mixture was put in a platinum crucible, and was heated in an electric furnace having an air atmosphere. When the heating temperature reached 800°C, it was held at the fixed temperature for about 72 hours. Thereafter, the mixed powder was cooled, and sodium carbonate was extracted with warm water. Since $Nb_{0.8}Sr_{0.2}Co_{1-z}Ni_zO_3$ thus produced was insoluble in water, it precipitated to the bottom of the container. The oxide was collected using filter paper, and was washed with water. The oxide obtained was verified by the X-ray diffraction to be a pure phase of substance having the perovskite type crystal structure.

Various compounds of the composition $Nb_{0.8}Sr_{0.2}Co_{1-z}Ni_zO_3$ in which z differed within the range of from 0.005 to 1.0 were synthesized by the method. Porous sintered body-air electrodes were formed as in Example 1 by the use of the materials, and their characteristics were compared. The obtained results are shown in FIG. 5.

Figure 5:
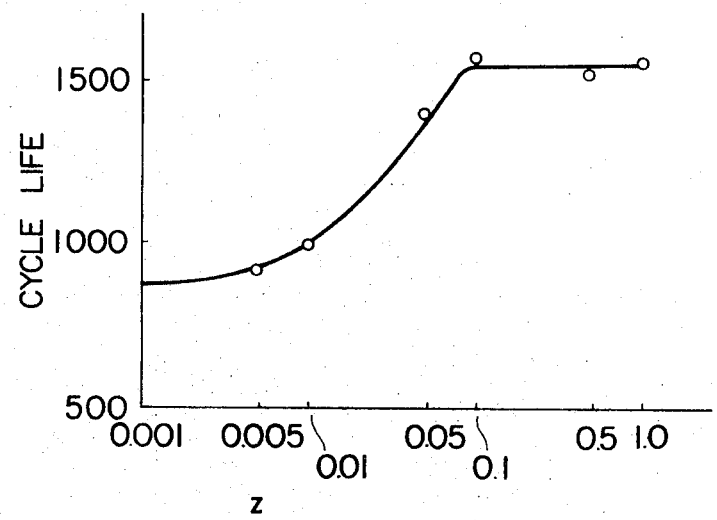

The current - voltage characteristics of the various air electrodes as illustrated in FIG. 5 have been made in such way that, when the air-cadmium battery in FIG. 2 was subjected to charging and discharging at a current density of 50 mA/cm² for 4 hours for each of them with each of the air electrodes used as the opposite electrode at the charging of the cadmium electrode, the relation between the electrode potential and the number of charge-discharge cycles was observed. Since the catalytic power by air is lost at a certain cycle, the electrode potential reaches a hydrogen generating potential. The particular cycle is utilized as the cycle life, and such cycle lives of the respective electrodes are shown in FIG. 5 in relation to the parameter z indicative of the amounts of addition of nickel. In order to facilitate seeing the characteristic at small values of z, the axis of abscissas of the graph in FIG. 5 is graduated in logarithm. A case where no nickel is added corresponds to $z = 0$, and the cycle life in the case is about 750. The effect of the addition of nickel is marked in a case where z is 0.01. When the parameter z indicative of the amount of addition of nickel is increased, a cycle life of 1,650 is exhibited at a value of 0.1. Even when the amount of nickel is increased more, the cycle life does not change. It is accordingly possible to say that the effective amount of addition of nickel for the electrode employed in the present invention corresponds to a range of z, $0.01 \leq z \leq 1.0$ for $Nb_{0.8}Sr_{0.2}Co_{1-z}Ni_zO_3$.

EXAMPLE 4

Compounds of the perovskite type with x being 0, 0.2, 0.4, 0.5 and 0.6 in $La_{1-x}Sr_xCo_{0.5}Ni_{0.5}O_3$ were synthesized by the method proposed by A. Wold, et al., as explained in Example 3. Using these porous sintered bodies, a battery similar to that shown in FIG. 2 was constructed, but zinc was used for the opposing electrode in case of the present example. With each air electrode itself employed as the opposite charging electrode at the charging of the zinc electrode, the charging and discharging of the battery were carried out under the conditions of a current density of 50 mA/cm² and a charging and discharging period of 4 hours. The relationship between the amount of addition of strontium $x$ and the charge-discharge cycle life of the electrode is illustrated in FIG. 6.

Figure 6:
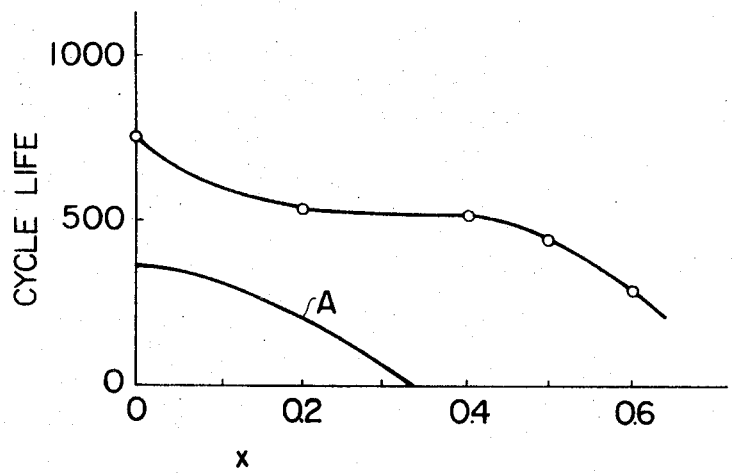

For the sake of comparison, FIG. 6 also shows as a curve A the relationship between $x$ and the cycle life of each porous sintered body made of a composition $La_{1-x}Sr_xCoO_3$ containing no nickel. From the comparison with the curve A, the effect of the addition of nickel is apparent. Further, even for large strontium contents, the electrodes added with Ni have comparatively long cycle lives. Therefore, the economical advantage can be pointed out that the rare earth being comparatively expensive can be saved.

EXAMPLE 5

Composite oxides with the perovskite type crystal structure as had the compositions of $Pr_{0.6}Sr_{0.4}Co_{0.9}Ni_{0.1}O_3$, $Sm_{0.6}Sr_{0.4}Co_{0.9}Ni_{0.1}O_3$, $Gd_{0.6}Sr_{0.4}Co_{0.9}Ni_{0.1}O_3$ and $Y_{0.6}Sr_{0.4}Co_{0.9}Ni_{0.1}O_3$, were synthesized by the following method. In conformity with the above-mentioned composition ratios, an acetate mixed solution of the constituent elements was prepared. Oxalic acid was added to the solution, to precipitate oxalates of the elements. The mixed oxalates were separated by filtration, were dried, and were burnt at 900°C for 1 hour. Then, the composite oxide was obtained. It was made an air electrode by the same procedure as in Example 1. The voltage values (values relative to a mercury oxide (HgO) reference electrode) and charge-discharge cycle lives (under the same condition as in Example 2) of the electrodes at a current density of 50 mA/cm² were as in Table 1 below.

Table 1

| Composition of Electrode | Operating Voltage (V vs. Hg/HgO reference electrode) (50 mA/cm²) | Cycle Life (cycles) |
| --- | --- | --- |
| $Pr_{0.6}Sr_{0.4}Co_{0.9}Ni_{0.1}O_3$ | + 0.025 | 810 |
| $Sm_{0.6}Sr_{0.4}Co_{0.9}Ni_{0.1}O_3$ | + 0.034 | 920 |
| $Gd_{0.6}Sr_{0.4}Co_{0.9}Ni_{0.1}O_3$ | + 0.037 | 931 |
| $La_{0.6}Sr_{0.4}Co_{0.9}Ni_{0.1}O_3$ | + 0.021 | 520 |
| $Y_{0.6}Sr_{0.4}Co_{0.9}Ni_{0.1}O_3$ | + 0.033 | 730 |

From the results listed in Table 1 and the result of the case where the lanthanide element in Example 1 was Nd, the effects of the changes of the rare earth elements on the various characteristics have been revealed. In any case, the characteristics of the air electrodes of the present invention are more excellent than those of the prior-art types of air electrodes. It is therefore proper that La, Pr, Nd, Sm, Gd and Y are contained as the rare earth elements in the compositions of the material of the electrode of the present invention.

EXAMPLE 6

With systems each containing a plurality of rare earth elements, air electrodes were constructed by quite the same method as in Example 1. The characteristics of these electrodes were as listed in Table 2 below. The cycle test was carried out under the same conditions as in Example 2.

Table 2

| Composition of Electrode | Operating Voltage (V vs. Hg/HgO) (50 mA/cm²) | Cycle Life (cycles) |
| --- | --- | --- |
| $La_{0.6}Y_{0.2}Sr_{0.2}Co_{0.2}Ni_{0.9}O_3$ | − 0.020 | 1,700 |
| $Nd_{0.7}La_{0.1}Sr_{0.2}Co_{0.2}Ni_{0.1}O_3$ | − 0.025 | 1,580 |
| $Sm_{0.4}La_{0.2}Y_{0.1}Sr_{0.2}Co_{0.9}Ni_{0.1}O_3$ | − 0.041 | 1,810 |

As apparent from the results listed in Table 2, even with the poly-rare earth element systems, there is no conspicuous difference in the characteristics from, for example, those of $Nd_{0.8}Sr_{0.2}Co_{0.9}Ni_{0.1}O_3$. Since, however, the characteristics are held even in the polyelement systems, the procedure of purifying the rare earth elements, etc., are simplified, and hence, economical advantages can be expected.

EXAMPLE 7

In the foregoing examples, description has been made of the cases where Sr was contained as the alkaline earth metal (or, no alkaline earth was contained in one of the specimens in Example 4). Herein will be described cases where Ca and Ba were employed as the alkaline earth. The method of manufacturing electrodes was started from acetates of various ingredients, and was similar to that of Example 1. The characteristics of the electrodes were as listed in Table 3, and were good in any case (the test method was the same as in Example 2).

Table 3

| Composition of Electrode | Operating Voltage (V vs. Hg/HgO) (50 mA/cm²) | Cycle Life (cycles) |
| --- | --- | --- |
| $La_{0.8}Ca_{0.2}Co_{0.8}Ni_{0.2}O_3$ | − 0.042 | 1,830 |
| $Sm_{0.8}Ba_{0.2}Co_{0.8}Ni_{0.2}O_3$ | − 0.031 | 1,400 |
| $Nd_{0.5}Ca_{0.5}Co_{0.8}Ni_{0.2}O_3$ | + 0.030 | 605 |

EXAMPLE 8

Air electrodes of systems each containing a plurality of alkaline earth elements were manufactured by the same method as in Example 1. Electrode characteristics in this case were as listed in Table 4, and every composition exhibited good characteristics (the test method was the same in Example 2).

Table 4

| Composition of Electrode | Operating Voltage (V vs. Hg/HgO) (50 mA/cm²) | Cycle Life (cycles) |
| --- | --- | --- |
| $La_{0.8}Sr_{0.1}Ca_{0.1}Co_{0.5}Ni_{0.5}O_3$ | − 0.033 | 1,510 |
| $Nd_{0.8}Ca_{0.1}Ba_{0.1}Co_{0.5}Ni_{0.5}O_3$ | − 0.047 | 1,580 |
| $Nd_{0.7}Ca_{0.1}Sr_{0.1}Ba_{0.1}Co_{0.5}Ni_{0.5}O_3$ | − 0.003 | 1,080 |

We claim:

1. A gas electrode which comprises a porous sintered body of an oxide having a perovskite type crystal structure represented by a general formula of $Ln_{1-x}A_x Co_{1-y}Ni_yO_{3-\delta}$, where $0 \leq x \leq 0.6$, $0.01 \leq y \leq 1.0$, $0 \leq \delta \leq (x/2)$, Ln denotes at least one element selected from the group consisting of La, Pr, Nd, Sm, Gd and Y, and A denotes at least one element selected from the group consisting of Ca, Sr and Ba, and a water repelling agent filling up interstices of said sintered body.

2. The gas electrode according to claim 1, wherein said water repelling agent is polytetrafluoroethylene.

3. A method of manufacturing a gas electrode, which comprises the steps of:
   a. preparing mixed powder in which oxides of component metal elements constituting a composite oxide represented by a general formula of $Ln_{1-x}A_x Co_{1-x}Ni_yO_{3-\delta}$, where Ln denotes at least one element selected from the group consisting of La, Pr, Nd, Sm, Gd and Y, A denotes at least one element selected from the group consisting of Ca, Sr and Ba, and $x$, $y$ and $\delta$ have ranges of $0 \leq x \leq 0.6$, $0.01 \leq y \leq 1.0$ and $0 \leq \delta \leq (x/2)$, respectively, are compactly mixed, said respectively compounds being so selected that the amounts of said component metal elements contained therein may satisfy said general formula in mol ratios,
   b. burning said mixed powder in an atmosphere containing oxygen, thereby to form said composite oxide having the perovskite type crystal structure as indicated by said general formula,
   c. adding a sizing agent to said composite oxide, and preparing a composite oxide molded body of predetermined shape under pressure,
   d. burning said molded body, to form a porous sintered body, and
   e. subjecting said porous sintered body to a water repellency treatment.

4. The method of manufacturing a gas electrode according to claim 3, wherein a temperature at which said mixed powder is burnt is selected from a range of from 850°C to 1,100°C.

5. The method of manufacturing a gas electrode according to claim 3, wherein said sizing agent is one member selected from the group consisting of polyvinyl alcohol, methylcellulose and carboxymethyl-cellulose.

6. The method of manufacturing a gas electrode according to claim 3, wherein a temperature at which said molded body is burnt is selected from a range of from 600°C to 1,000°C.

7. The method of manufacturing a gas electrode according to claim 3, wherein said water repellency treatment comprises the steps of immersing said porous sintered body in a suspension of polytetrafluoroethylene, drying said porous sintered body thus treated, and heat-treating the dried porous sintered body in a temperature range of from 200°C to 250°C.

* * * * *